Patented Apr. 3, 1951

2,547,653

UNITED STATES PATENT OFFICE 2,547,653

FLUID FOR USE IN CONTACT WITH THE HUMAN EYEBALL

Bradford R. Minnis and James H. Conover, Chicago, Ill.

No Drawing. Application March 10, 1948, Serial No. 14,147

10 Claims. (Cl. 167—59)

This invention relates to fluids to be used in contact with the human eyeball and more particularly to contact lens fluids and to eye washes.

Contact lenses were first developed more than one hundred years ago. As the name suggests, they are designed to be worn against the eyeball, between the eyeball and the eyelid. The early lenses were made of glass, but, commencing about ten years ago, increasing use has been made of organic high polymers, principally polymethylmethacrylate, until today few lenses are made of glass. With either material a blank is formed which matches the contours of the eyeball except in the area directly over the cornea. Here a small pocket is provided for retention of a fluid; the primary purpose of the fluid is to furnish a liquid-liquid contact between the cornea and the lens to minimize diffraction and other undesirable effects which would result were a medium of sharply different refractive index, such as air, interposed between the cornea and the lens. The area of the lens over the fluid pocket and directly in front of the cornea is ground to provide the desired optical correction.

A great many different fluids have been suggested for use between contact lenses and the eyeball. In general, all are aqueous solutions exhibiting about the same osmotic pressure as the fluids of the eye. This is considered to be about the osmotic pressure of a physiological salt solution, usually stated to be a solution containing .9% sodium chloride, although the exact concentration will vary somewhat with different individuals. The pH of the contact lens fluids will range from about 7 to about 9. Most frequently they are buffered at pH values between about 8 and about 9. The materials most commonly used in these fluids include sodium chloride, sodium bicarbonate, borax, boric acid, and the like, alone or as mixtures of two or more thereof. Commercial fluids are also available which are stated to be based on organic materials such as sorbitol, lactose, and various of the simpler carbohydrates. In many instances the fluids have contained a small amount of a thickener, such as methyl cellulose, polyvinyl alcohol, or gelatin.

Contact lenses have a number of distinct advantages over conventional glasses. The most important of these is that contact lenses effect no change in the appearance of the wearer. Contact lenses may be used where corneal scars are present, whereas conventional glasses cannot provide the necessary correction in these instances. Contact lenses are much less subject to breakage than conventional glasses and for this reason are often worn by athletes engaged in sports requiring bodily contact, such as football. Conventional glasses are subject to collection of dirt and fogging from perspiration and exposure to sudden changes in temperature and humidity, whereas contact lenses are free from these difficulties. Further, at least in the case of adults, it is rarely necessary to change the prescription of contact lenses with the passage of time, whereas with conventional glasses a change of prescription every few years is by no means unusual.

Despite all these advantages over conventional glasses, contact lenses today account for only a minor proportion of the total sales of vision correctives. The principal reason that the advantages of contact lenses have not been reflected in higher sales is that as at present constituted contact lenses may be worn only for periods no longer than about 3 or 4 hours. Several effects are manifest at the end of such periods which necessitate removal of the lenses. The eyes become irritated and bloodshot. In some cases this irritation is accompanied by considerable pain. The vision is dimmed, and halos and rainbows appear, particularly around artificial lights. These phenomena arise after three or four hours of wear, no matter which of the hereinbefore cited types of fluids are used. Removal of the lenses and replacement of the old fluid with fresh fluid must often be delayed for about an hour and even then the lenses may be worn only for an hour or two, after which the lenses may not be worn until the eyes have been permitted several hours of rest. It is probable that this difficulty has accounted for the development of so many different contact lens fluids. However, none of the fluids described is significantly superior in this respect to the others.

It is an object of this invention to prepare improved fluids for use in contact with the human eyeball.

It is another object of this invention to prepare superior contact lens fluids.

It is a further object of this invention to improve contact lens fluids hitherto known.

It is a still further object of this invention to provide these improvements with inexpensive and readily available materials.

Additional objects will become apparent from the ensuing description of the invention.

We have found that these and other desirable objects may be achieved by the inclusion in the fluid of an alkali metal salt of a condensed phosphate. By the term condensed phosphate we mean a phosphate having in its acid form molecular water less than that of the orthophosphate. Included in the term condensed phosphate are the metaphosphates, the pyrophosphates, and the various polyphosphates, such as the tri and tetra polyphosphates, the tri meta phosphates and the hexa meta phosphates. Of these our preferred condensed phosphates are the polyphosphate glasses, i. e. those phosphates of molecular weight sufficiently high that they are prepared only as amorphous glasses rather than as crystalline compounds. From the standpoint of availability and economy the most suitable of the polyphosphate glasses is the hexametaphosphate. We prefer to use between about 2 and about 500 parts per million of condensed phosphate in our fluids, but we have also found it possible to use a condensed phosphate in amounts as high as those required to give an isotonic solution, that is, a solution having the same osmotic pressure as the natural fluids of the eye. In the preferred form of our invention a condensed phosphate is used in conjunction with one or more of the materials known to the prior art, such as sodium chloride, sodium bicarbonate, borax, boric acid, sorbitol and the like. Since minor quantities of condensed phosphate are effective, we have found it possible to improve presently available contact lens fluid simply by adding thereto a minor quantity of condensed phosphate.

As specific example of our invention the following are presented to enable those skilled in the art better to understand the invention. The examples are illustrative merely and are not to be construed as imposing any limitations on the invention, except as defined in the hereunto appended claims. Except as otherwise stated parts are by weight.

It will be understood that the osmotic pressure of the natural fluids of the eye varies somewhat with different individuals. Thus, isotonic sodium chloride solutions may contain from about .5% to about 1.2% sodium chloride, and isotonic sodium bicorbonate solutions may contain from about 1.2% to about 2.9% sodium bicarbonate. Hence, adaptation of the fluids described in the examples to individuals other than those particular ones for whom the fluids were designed may well require adjustment of the water content to make the fluid isotonic to such other individuals. Such adjustments of water content are well understood by those currently supplying contact lens fluids.

Example 1

| | |
|---|---|
| Sodium bicarbonate | 1.000000 |
| Sodium chloride | .500000 |
| Methyl cellulose | .003000 |
| Sodium hexametaphosphate | .000006 |
| Water (distilled) | 98.496994 |

The sodium hexametaphosphate used in this example was a technical grade which had a slightly higher $Na_2O$ to $P_2O_5$ ratio than that of the pure compound. This fluid was tested in comparison to a fluid of exactly the same formula, except that the sodium hexametaphosphate was omitted from the comparison fluid. Lenses with the comparison fluid were worn for 3 and ¾ hours before dimming of vision and excessive irritation were experienced by the wearer. A rest period of 45 minutes was required before the lenses could be replaced, using fresh fluid. The lenses after replacement were worn for an hour and a quarter before dimming of vision and irritation again required their removal. The result of this test is typical of the performance of the prior art lens fluids. In sharp contrast, use of the sodium hexametaphosphate-containing fluid permitted the same lenses to be worn by the same individual for 10 hours before dimming of vision developed. At the end of this period the old fluid was replaced with fresh fluid, without any rest period, and the lenses were worn for an additional 8 hours without discomfort. Thus, our new fluid has overcome the principal disadvantage under which contact lenses have labored. For the first time, it is now possible for a person to wear contact lenses all day without discomfort or dimming of vision. One replacement of fluid is normally all that is required.

Example 2

| | |
|---|---|
| Sodium bicarbonate | 1.0 |
| Sodium chloride | .5 |

The salts were dissolved in sufficient water to make 100 parts of solution, using water containing 100 parts per million of sodium hexametaphosphate.

Example 3

| | |
|---|---|
| Sodium bicarbonate | 2.5 |

The sodium bicarbonate was dissolved in sufficient water to make 100 parts of solution, using water containing 100 parts per million of sodium hexametaphosphate.

Example 4

| | |
|---|---|
| Sodium hexametaphosphate | .5 |
| Sodium chloride | .5 |
| Sodium bicarbonate | 1.1 |

The salts were dissolved in sufficient distilled water to make 100 parts of solution.

Example 5

To a commercial fluid based on sorbitol was added sufficient tetra potassium pyrophosphate to amount to 150 parts thereof per million of fluid. The fluid was considerably improved thereby.

Example 6

To a commercial fluid containing sodium chloride, borax, and boric acid was added sufficient sodium tripolyphosphate to amount to 200 parts thereof per million of fluid. The fluid was considerably improved thereby.

Example 7

| | |
|---|---|
| Sodium bicarbonate | 1.0 |
| Sodium chloride | .5 |
| Sodium acid pyrophosphate | .003 |

The salts were dissolved in sufficient distilled water to make 100 parts of solution.

Example 8

| | |
|---|---|
| Sodium bicarbonate | .5 |
| Sodium chloride | .8 |
| Sodium trimetaphosphate | .0015 |
| Distilled water | 98.6985 |

Example 9

| | |
|---|---|
| Gelatin | .0025 |
| Sodium bicarbonate | 2.5 |
| Sodium tetraphosphate | .001 |
| Distilled water | q. s. to make 100 |

The foregoing fluids are also useful as eye washes.

In summary, our invention is an improved fluid for use in contact with the human eyeball comprising an aqueous solution of an alkali metal condensed phosphate. Our improved fluids permit, for the first time, the wearing of contact lenses all day.

We claim:

1. A clear aqueous solution having approximately the same osmotic pressure as the natural fluids of the human eye which comprises ingredients normally used to produce isotonic solutions and at least about 2 parts per million parts of solution of alkali metal phosphate selected from the group of the metaphosphates, the pyrophosphates and the polyphosphates.

2. A composition adapted to be converted by addition of water into an aqueous solution suitable for use in contact with the human eyeball which composition comprises ingredients normally used to produce isotonic solutions and alkali metal phosphate selected from the group of the metaphosphates, the pyrophosphates and the polyphosphates, the amount of the latter in the said composition being sufficient to provide at least about 2 parts thereof per million parts of solution when water is added thereto in an amount sufficient to form a solution having approximately the same osmotic pressure as the natural fluids of the eye.

3. As a fluid for use in contact with the human eyeball an aqueous solution having approximately the same osmotic pressure as the natural fluids of the eye, the said solution comprising simple carbohydrate and at least about 2 parts per million parts of solution of alkali metal phosphate selected from the group of the metaphosphates, the pyrophosphates and the polyphosphates.

4. A composition adapted to be converted by addition of water into an aqueous solution suitable for use in contact with the human eyeball which composition comprises simple carbohydrate and alkali metal phosphate selected from the group of the metaphosphates, the pyrophosphates and the polyphosphates, the amount of the latter in the said composition being sufficient to provide at least about 2 parts thereof per million parts of solution when water is added thereto in an amount sufficient to form a solution having approximately the same osmotic pressure as the natural fluids of the eye.

5. As a fluid for use in contact with the human eyeball an aqueous solution having approximately the same osmotic pressure as the natural fluids of the eye, the said solution comprising sodium chloride and at least about 2 parts per million parts of solution of alkali metal phosphate selected from the group of the metaphosphates, the pyrophosphates and the polyphosphates.

6. A composition adapted to be converted by addition of water into an aqueous solution suitable for use in contact with the human eyeball which composition comprises sodium chloride and alkali metal phosphate selected from the group of the metaphosphates, the pyrophosphates and the polyphosphates, the amount of the latter in the said composition being sufficient to provide at least about 2 parts thereof per million parts of solution when water is added thereto in an amount sufficient to form a solution having approximately the same osmotic pressure as the natural fluids of the eye.

7. As a fluid for use in contact with the human eyeball an aqueous solution having approximately the same osmotic pressure as the natural fluids of the eye, the said solution comprising simple carbohydrate and sodium hexametaphosphate in an amount equal to at least about 2 parts thereof per million parts of solution.

8. A composition adapted to be converted by addition of water into an aqueous solution suitable for use in contact with the human eyeball which composition comprises simple carbohydrate and sodium hexametaphosphate, the amount of the latter in the said composition being sufficient to provide at least about 2 parts thereof per million parts of solution when water is added thereto in an amount sufficient to form a solution having approximately the same osmotic pressure as the natural fluids of the eye.

9. As a fluid for use in contact with the human eyeball an aqueous solution having approximately the same osmotic pressure as the natural fluids of the eye, the said solution comprising dextrose and sodium hexametaphosphate in an amount equal to at least about 2 parts thereof per million parts of solution.

10. A composition adapted to be converted by addition of water into an aqueous solution suitable for use in contact with the human eyeball which composition comprises dextrose and sodium hexametaphosphate, the amount of the latter in the said composition being sufficient to provide at least about 2 parts thereof per million parts of solution when water is added thereto in an amount sufficient to form a solution having approximately the same osmotic pressure as the natural fluids of the eye.

BRADFORD R. MINNIS.
JAMES H. CONOVER.

REFERENCES CITED

The following references are of record in the file of this patent:

UNITED STATES PATENTS

| Number | Name | Date |
|---|---|---|
| 1,858,905 | Rumanceff | May 17, 1932 |
| 2,078,943 | Hall | May 4, 1937 |

OTHER REFERENCES

Gordon, Brit. J. Exptl. Path., vol. 22, pages 226–33 (1941), through Chem. Abst., vol. 36: 553 (1942).

Larson, Proc. Soc. Exptl. Biol. Med., vol. 44, pp. 554–5 (1940), through Chem. Abst., vol. 34: 6362 (1940).

Medi-Calgon Pamphlet, 11 pages, Calgon, Inc., 300 Ross St., Pittsburgh, Pa., July 11, 1945 (rec'd).

J. A. M. A., vol. 129, No. 18, page 1295–6, Dec. 29, 1945.

Obrig, Archives of Opthalmology, Nov. 1947, pp. 668–676.

Brecht, The Merck Report, Jan. 1945, pages 15–19.

Jones, Industrial Medicine, Aug. 1937, pages 459–462.